(12) United States Patent
Karimi

(10) Patent No.: US 6,462,920 B1
(45) Date of Patent: *Oct. 8, 2002

(54) METHOD AND SYSTEM FOR REDUCING MR HEAD INSTABILITY

(75) Inventor: Rahmat Karimi, Los Altos, CA (US)

(73) Assignee: Read-Rite Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,300

(22) Filed: Dec. 23, 1998

(51) Int. Cl.$^7$ .................................................. G11B 5/39
(52) U.S. Cl. .................................................. 360/327.31
(58) Field of Search ........................ 360/324.12, 327.1, 360/327.3, 327.31

(56) References Cited

U.S. PATENT DOCUMENTS

| | | | |
|---|---|---|---|
| 5,438,470 A | 8/1995 | Ravipati et al. | 360/113 |
| 5,458,908 A * | 10/1995 | Krounbi et al. | 427/123 |
| 5,491,600 A | 2/1996 | Chen et al. | 360/113 |
| 5,508,866 A | 4/1996 | Gill et al. | 360/113 |
| 5,581,427 A | 12/1996 | Feng et al. | 360/113 |
| 5,666,246 A | 9/1997 | Gill et al. | 360/113 |
| 5,708,358 A | 1/1998 | Ravipati | 324/252 |
| 5,721,008 A * | 2/1998 | Huang et al. | 204/192.34 |
| 5,737,157 A | 4/1998 | Gill | 360/113 |
| 5,739,990 A | 4/1998 | Ravipati et al. | 360/113 |
| 5,742,459 A | 4/1998 | Shen et al. | 360/113 |
| 5,748,399 A | 5/1998 | Gill | 360/66 |
| 5,748,415 A | 5/1998 | Christner et al. | 360/113 |
| 5,748,416 A | 5/1998 | Tobise et al. | 360/113 |
| 5,768,069 A * | 6/1998 | Mauri | 360/113 |
| 5,898,549 A * | 4/1999 | Gill | 360/113 |
| 5,923,505 A * | 7/1999 | Kroes et al. | 360/113 |
| 6,185,081 B1 * | 2/2001 | Simion et al. | 360/327.3 |

* cited by examiner

Primary Examiner—William Klimowicz
(74) Attorney, Agent, or Firm—Sawyer Law Group LLP

(57) ABSTRACT

A system and method for providing a magnetoresistive head is disclosed. The method and system include providing a first gap and providing a seed layer. The seed layer is disposed above the first gap and has a space therein. The method and system further include providing a magnetoresistive element substantially covering the space in the seed layer and providing a hard bias layer above the seed layer. A portion of the hard bias layer is immediately adjacent to a portion of the magnetoresistive element.

6 Claims, 6 Drawing Sheets

METHOD AND SYSTEM FOR REDUCING MR HEAD INSTABILITY

FIELD OF THE INVENTION

The present invention relates to magnetoresistive heads and more particularly to a method and system for improving the stability of a MR head.

BACKGROUND OF THE INVENTION

Conventional magnetoresistive (MR) heads use a MR element to sense the magnetization of bits in a track being read by the head. The MR element in the conventional MR head may include either an an isotropic magnetoresistive (AMR) element or a giant magnetoresistive (GMR) element. In either case, the MR element is magnetically biased. Typically, a conventional hard magnetic layer is used to bias the MR element. Typically, the hard magnetic layer includes cobalt-chrome-platinum. The MR head also includes leads for carrying current to and from the MR element. The leads are typically provided on the hard bias layer.

In order to provide the hard magnetic layer, a seed layer is provided. Typically, the seed layer is chromium. Thus, in the conventional MR head, the MR element is formed first. The seed layer is then deposited. The hard magnetic layer is then deposited on the seed layer. The magnetization of the hard magnetic layer can then bias the MR element.

Although the conventional MR head functions, the coupling between the hard magnetic layer and the MR element is reduced by the existence of the seed layer. Because of this, the MR element is more likely to include domain walls and, therefore, is more subject to noise.

Accordingly, what is needed is a system and method for providing a MR head having a magnetically stable MR element. The present invention addresses such a need.

SUMMARY OF THE INVENTION

The present invention provides a method and system for providing a stable magnetoresistive head. The method and system comprise providing a first gap and providing a seed layer. The seed layer is disposed above the first gap and has a space therein. The method and system further comprise providing a magnetoresistive element substantially covering the space in the seed layer and providing a hard bias layer above the seed layer. A portion of the hard bias layer is immediately adjacent to a portion of the magnetoresistive element.

According to the system and method disclosed herein, the present invention more strongly couples the hard bias layer to the magnetoresistive element, thereby increasing magnetic stability of the head and reducing noise due to domain wall motion. The noise is reduced because the seed layer is not present between the MR element and the hard bias layer.

DETAILED DESCRIPTION OF THE INVENTION

The present invention relates to an improvement in magnetoresistive heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
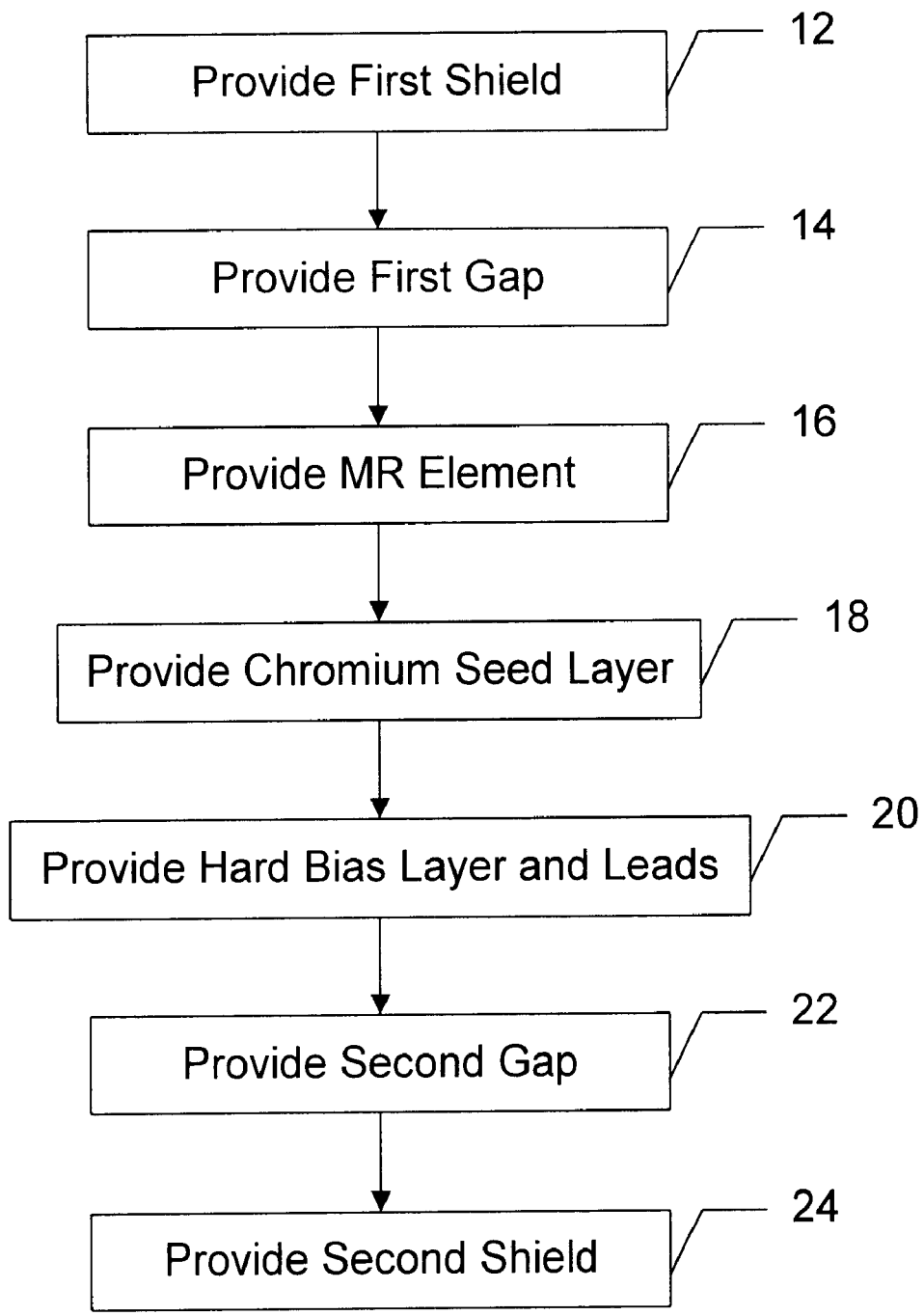
FIG. 1 is a flow chart depicting a conventional method for providing a magnetoresistive head.

FIG. 1 is a flow chart depicting a conventional method 10 for providing a magnetoresistive (MR) head. A first magnetic shield is provided via step 12. A first gap is then provided via step 14. The MR element is then provided in step 16. The MR element provided in step 16 could be either a giant magnetoresistive (GMR) element or an an isotropic magnetoresistive (AMR) element. The MR element provided in step 16 is to be magnetically biased. Consequently, a seed layer is provided, via step 18. A hard bias layer and leads are provided via step 20. The seed layer ensures that the microstructure of the hard bias layer is as desired. Typically, the seed layer provided in step 18 is a chromium layer. The hard bias layer provided in step 20 is typically a cobalt-chromium-platinum layer. A second gap is then deposited, via step 22. The second shield is then deposited in step 24.

Figure 2:
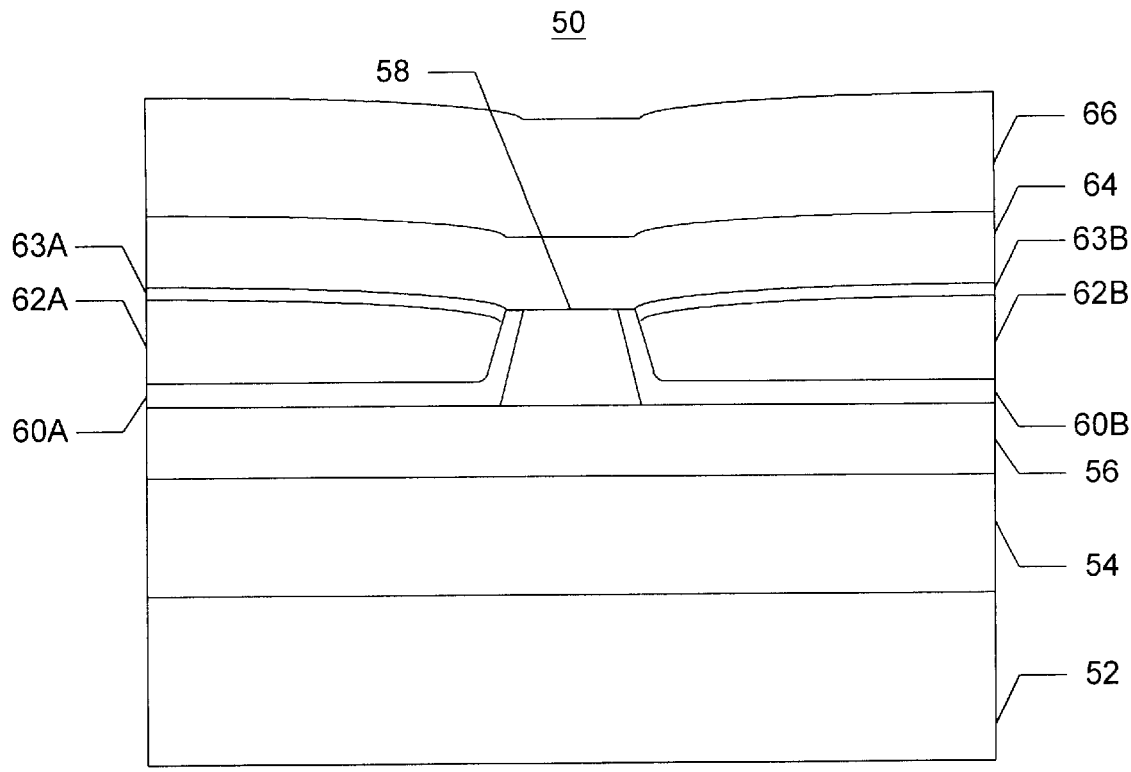
FIG. 2 is a block diagram of a conventional magnetoresistive head.

FIG. 2 depicts a conventional MR head 50 formed using the method 10. The conventional MR head 50 includes a first shield 54 deposited on the substrate 52. The first gap 56 is on the first shield. Above the first gap 56 is the MR element 58 and the seed layer 60. The seed layer 60 includes two portions 60A and 60B. Hard bias layer 62, including portions 62A and 62B is on the seed layer 60. The MR head 50 also includes leads 63A and 63B provided on top of the hard bias layer 62. The hard bias layer 62 magnetically biases the MR element 58. The leads 63A and 63B carry current to and from the MR element 58. The second gap 64 and second shield 66 are on the hard bias layer 62 and the MR element 58.

The hard bias layer 62 is used to try to ensure that the MR element 58 does not have multiple magnetic domains and, therefore, does not have domain walls. In order to do so, the hard bias layer 62 is magnetically hard and will have its magnetization unchanged when the MR head 50 is brought into proximity with a magnetic recording material (not shown). The seed layer 62 is formed immediately prior to the hard bias layer 62 and covers the MR element 58 to ensure the proper microstructure of the hard bias layer 62. Without the proper microstructure, the hard bias layer 62 does not have the requisite magnetic properties.

Stabilizing the MR element 58 by magnetically biasing the MR element 58 reduces noise. If the MR element 58 has a multi-domain structure, the domain walls of the MR element 58 may move when the MR element 58 is brought into proximity with a magnetic field. Thus, the when the MR head 50 is used to read bits stored on the recording media, any domain walls may move. Domain wall motion causes non-repeatable noise. Therefore, it is desirable for the MR element 58 to be free of domain walls. The hard bias layer 62 is used to magnetically bias the MR element 58 to ensure that the MR element 58 has no domain walls. Thus, noise is reduced.

Although the MR head 50 functions, one of ordinary skill in the art will realize that in the conventional method 10, the MR element 58 is formed prior to the seed layer 60 and the hard bias layer 62. The seed layer 60 is formed immediately before the hard bias layer 62 to ensure that the hard bias layer 62 has the correct microstructure. However, the seed layer 60 between the hard bias layer 62 and the MR element 58 is also nonmagnetic. As a result, the magnetic coupling between the MR element 58 and the hard bias layer 62 is weakened. The weakening in the coupling between the hard bias layer 62 and the MR element 58 reduces the ability of the hard bias layer 62 to stabilize the MR element 58. This may allow domain walls to be formed within the MR element 58. Thus, non-repeatable noise may be increased.

The present invention provides for a method and system for providing a magnetoresistive head. The method and system comprise providing a first gap and providing a seed layer. The seed layer is disposed above the first gap and has a space therein. The method and system further comprise providing a magnetoresistive element substantially covering the space in the seed layer and providing a hard bias layer above the seed layer. A portion of the hard bias layer is immediately adjacent to a portion of the magnetoresistive element.

The present invention will be described in terms of a particular magnetoresistive head formed of particular materials. However, one of ordinary skill in the art will readily recognize this method and system will operate effectively for other magnetoresistive heads having other constituents and formed of other materials.

Figure 3:
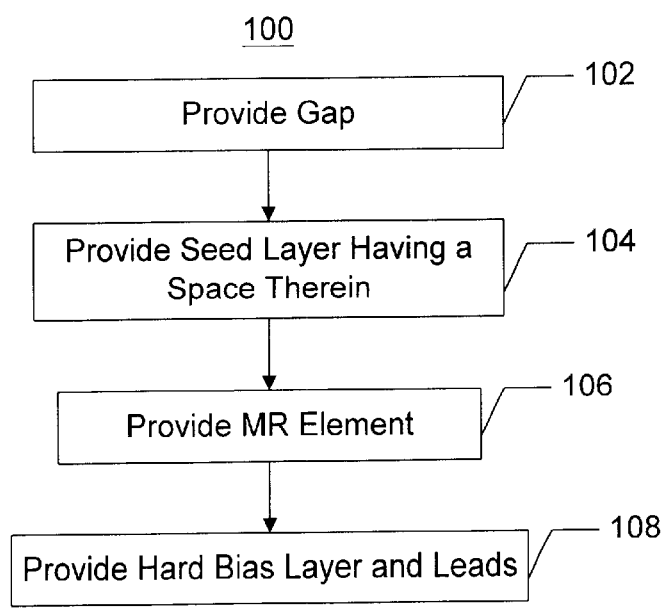
FIG. 3 is a flow chart depicting a method for providing a magnetoresistive head in accordance with the present invention.

To more particularly illustrate the method and system in accordance with the present invention, refer now to FIG. 3 depicting a flow chart of one embodiment of a method 100 for providing a MR head in accordance with the present invention. A first gap is provided, via step 102. A seed layer is then provided, via step 104. The seed layer has a space within it. An MR element is then formed above the space, via step 106. The MR element has a read width which is on the order of the size of tracks (not shown) the MR element will be used to read. A hard bias layer is then provided, via step 108. In a preferred embodiment, step 108 also includes providing leads on the hard magnetic layer in the hard bias layer.

Figure 4:
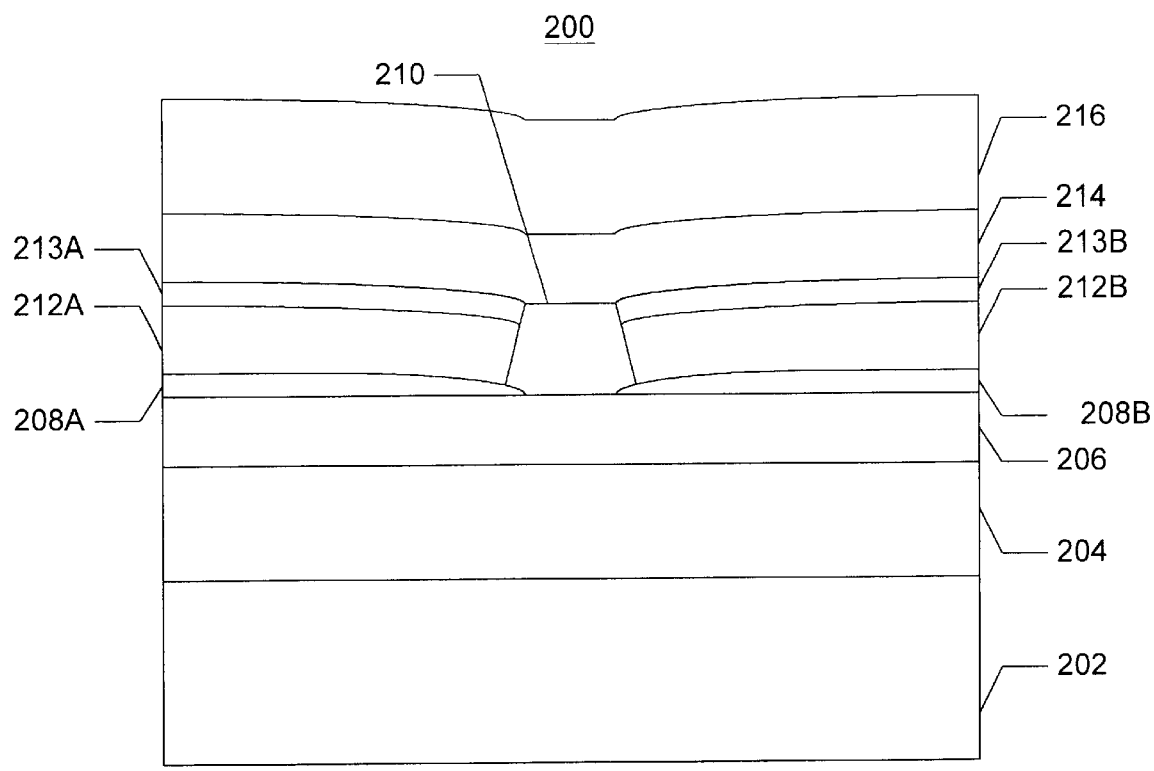
FIG. 4 is a block diagram of a magnetoresistive head in accordance with the present invention.

FIG. 4 depicts a MR head 200 formed in accordance with the present invention. The MR head 200 is preferably a contiguous junction head, as depicted in FIG. 4. The MR head 200 includes a first shield 204 on a substrate 202. A first gap 206 is above the first shield. The seed layer 208 including two portions 208A and 208B is formed above the first gap 206. In a preferred embodiment, the seed layer 208 includes chromium. The MR element 210 is formed over the space in the seed layer 208. The MR element 210 may be either an AMR element or a GMR element. A hard bias layer 212 including two portions 212A and 212B is disposed above the seed layer 208 and adjacent to the edges of the MR element 210. The MR head 200 also leads 213A and 213B on the hard bias layer 212. The leads 213A and 213B are used to carry current to and from the MR element 210. In a preferred embodiment, the hard bias layer 212 includes cobalt-chromium-platinum. Also in a preferred embodiment, the leads 213A and 213B are gold or copper leads. A second gap 214 and second shield 216 are disposed above the MR element 210 and hard bias layer 212.

Because deposition of the hard bias layer 212 has been decoupled from deposition of the seed layer 208, the hard bias layer 212 is immediately adjacent to the edges of the MR element 210. There is no nonmagnetic layer separating the hard bias layer 212 from the MR element 210. As a result, the magnetic coupling between the hard bias layer 212 and the MR element 210 is increased. The magnetization of the MR element 210 is better stabilized. The probability of domain walls occurring within the MR element 210 is lowered. There is also an attendant decrease in noise due to domain wall motion. In addition, the resistance at the junctions between the MR element 210 and hard bias layer 212 is decreased. This decrease in resistance is due to the absence of the seed layer 208 between the MR element 210 and the hard bias layer 212. If a portion of the seed layer 208 existed between the MR element 210 and the hard bias layer 212 or leads 213A and 213B, this portion of the seed layer 208 would scatter electrons traveling between the MR element 210 and the hard bias layer 212 or the leads 213A and 213B. When the portion of the seed layer 208 between the MR element 210 and the hard bias layer 212 or leads 213A and 213B is removed, Thus, the performance of the MR head 100 is further improved.

As discussed above, the seed layer 208 does not separate the MR element 210 from the hard bias layer 212. Thus, only part of the surface on which the hard bias layer 212 is grown is covered with the seed layer 208. Contrary to what might have been expected when a portion of the hard bias layer 212 is not grown on the seed layer 208, the hard bias layer 212 still has the desired magnetic properties. Consequently, the hard bias layer 212 stabilizes the MR element 210. Therefore, noise due to domain wall motion is reduced.

Figure 5:
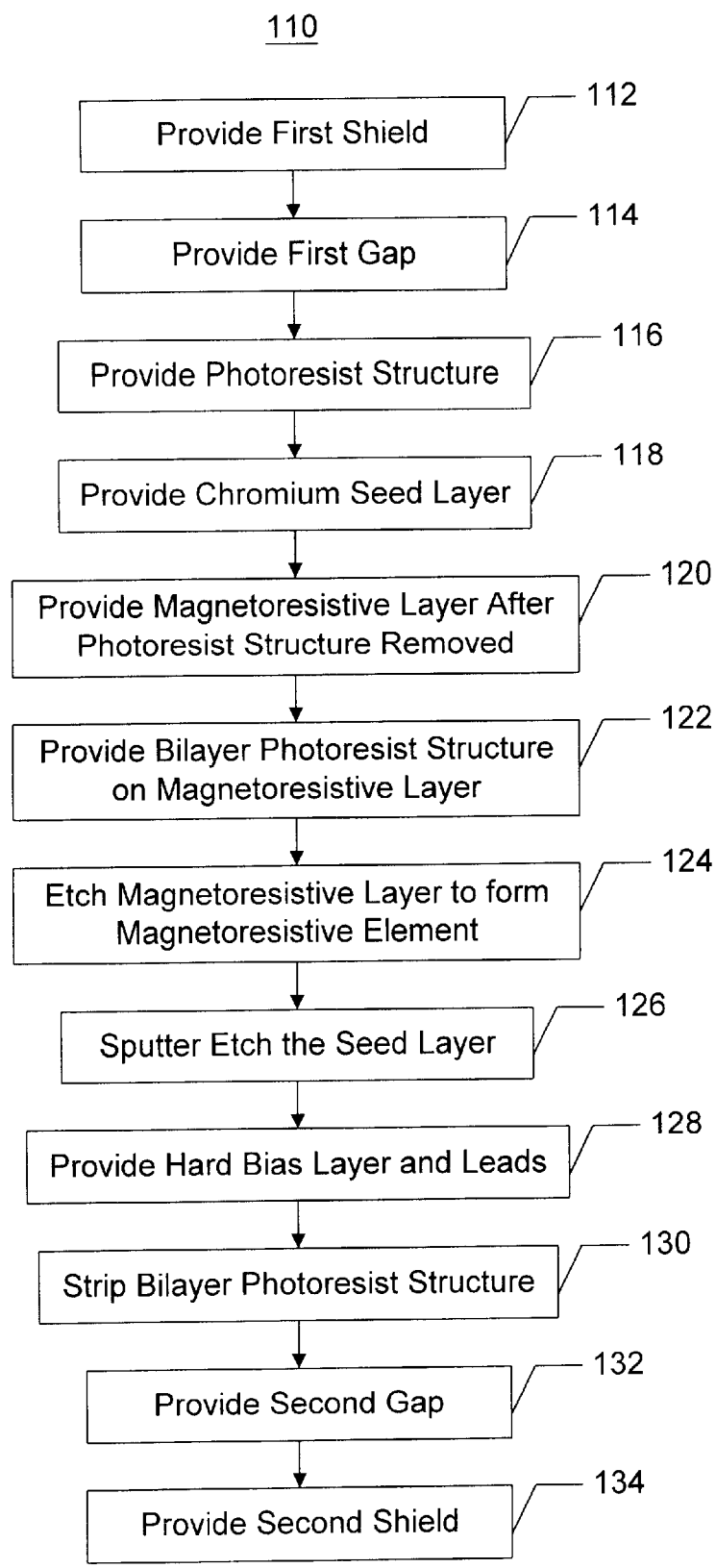
FIG. 5 is a more detailed flow chart of a method for providing a magnetoresistive head in accordance with the present invention.
Figure 6A:
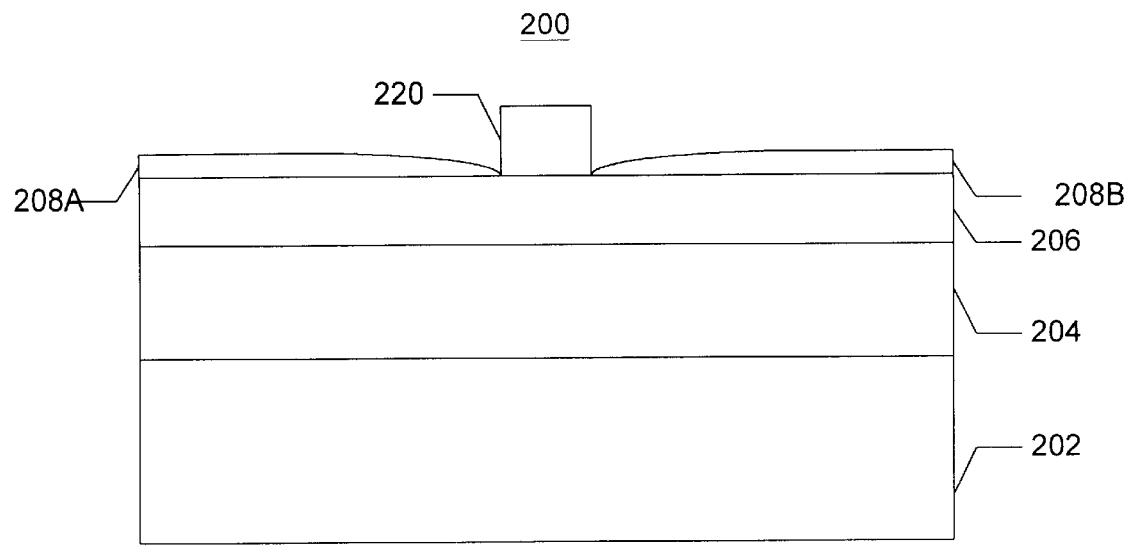
FIG. 6A is a block diagram of the magnetoresistive head in accordance with the present invention during fabrication, after the seed layer has been provided.

FIG. 5 depicts a more detailed flow chart of a preferred embodiment of a method 110 for providing the MR head 200 in accordance with the present invention. FIG. 5 will be discussed in conjunction with FIGS. 6A–6D, which depict the MR head 200 during formation using the method 200. Referring now to FIG. 5, the first shield 204 and first gap 206 are provided via steps 112 and 114, respectively. A photoresist structure having a width on the order of the read width is then provided, via step 116. A chromium seed layer is then deposited, via step 118. FIG. 6A depicts the MR head 200 after the seed layer 208 has been provided. Because the seed layer 208 is provided after formation of the photoresist structure 220, the seed layer has a space defined by the photoresist structure. Although the space is formed in the method 110 by providing the photoresist structure prior to deposition of the seed layer 208, nothing prevents the method and system from forming the space in the seed layer 208 using another mechanism.

Figure 6B:
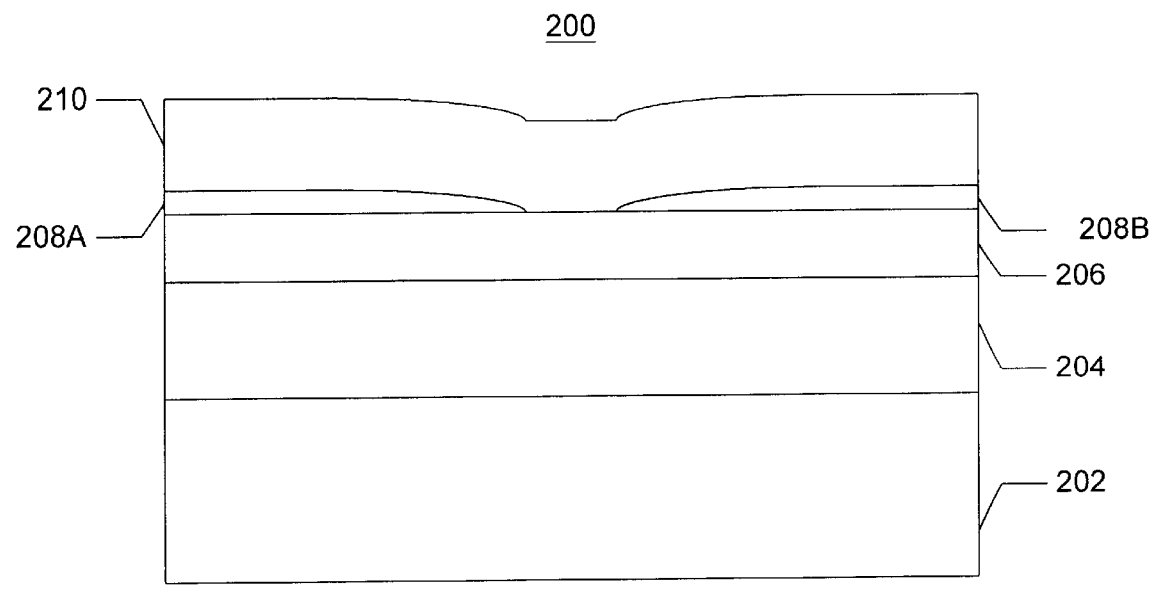
FIG. 6B is a block diagram of the magnetoresistive head in accordance with the present invention during fabrication, after the layer forming the magnetoresistive head has been provided.

Referring back to FIG. 5, the layer which will form the MR element 210 is then provided, via step 120. Although discussed in the context of providing a layer, step 120 typically includes providing several layers for the AMR element or for the GMR element. FIG. 6B depicts the MR head 200 after completion of step 120. The photoresist structure 220 has been removed, and the layer forming the MR element 210 provided.

Figure 6C:
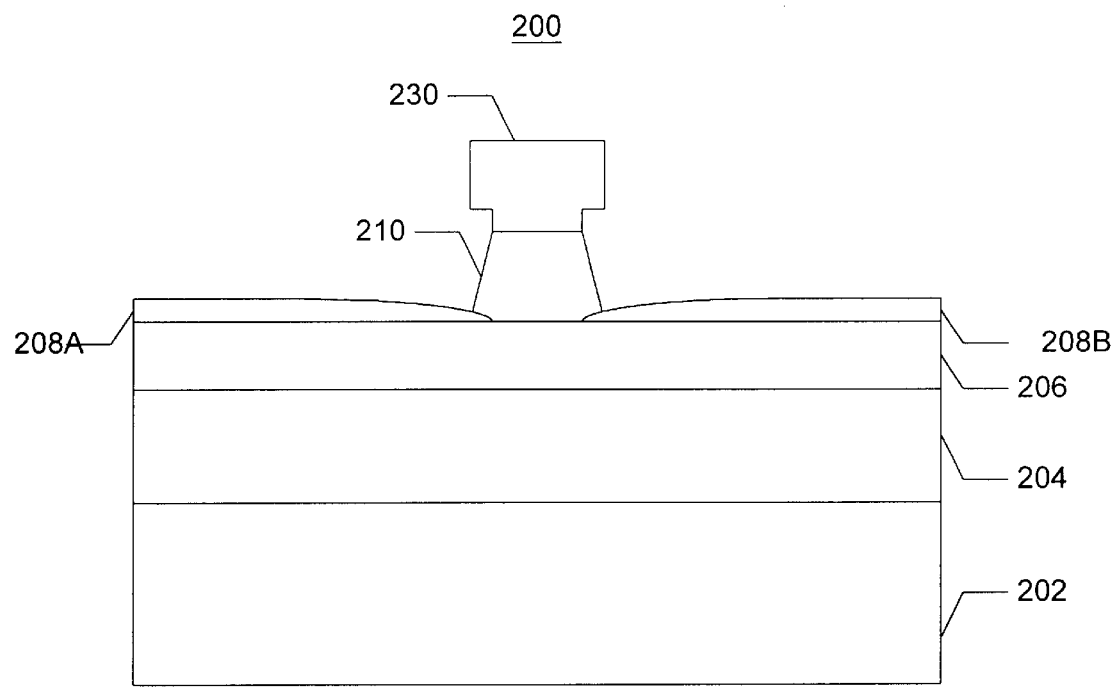
FIG. 6C is a block diagram of the magnetoresistive head in accordance with the present invention during fabrication, prior to deposition of the hard bias layer.

Referring back to FIG. 5, a bilayer photoresist structure is then provided substantially above the space in the seed layer, via step 122. The MR head is then etched to form the MR element 210, via step 124. FIG. 6C depicts the MR head 200 after formation of the MR element 210. The bilayer photoresist structure 230 helps ensure the desired profile of the MR element 210 and aids in reducing redeposition of material on the MR element 210 during step 122. Because the bilayer photoresist structure 230 is formed substantially above the space in the seed layer 208, the MR element 210 is formed substantially within the space in the seed layer 208.

Figure 6D:
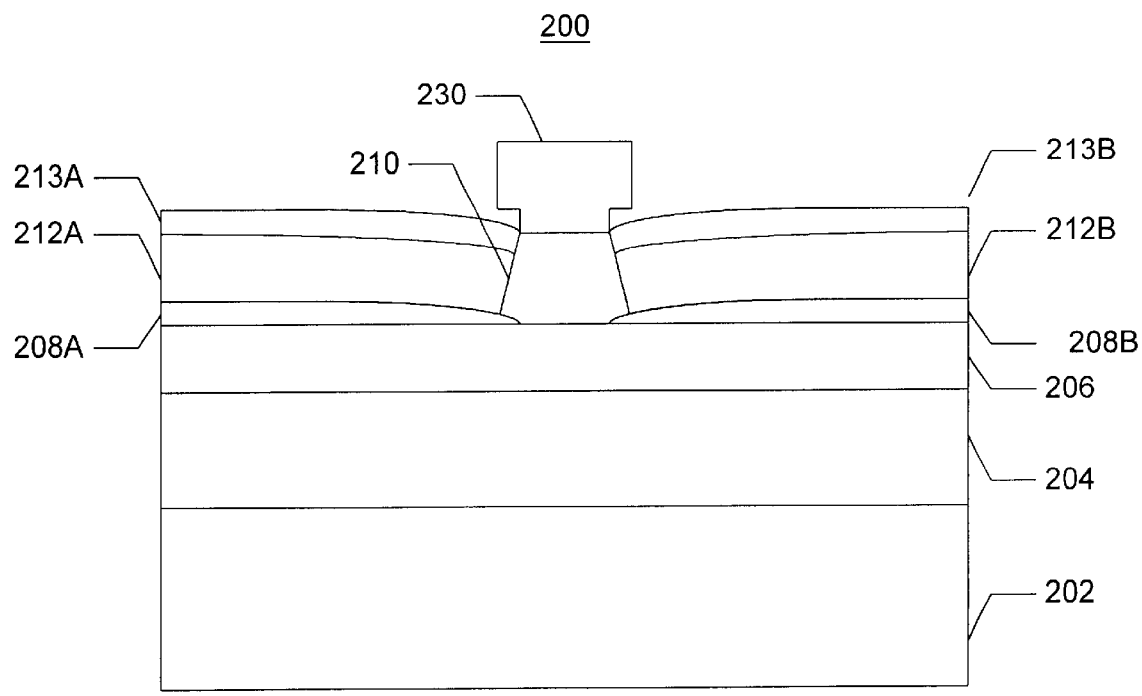
FIG. 6D is a block diagram of the magnetoresistive head in accordance with the present invention during fabrication, after the hard bias layer has been provided.

While the photoresist structure remains in place, the seed layer 208 is sputter etched, via step 126 depicted in FIG. 5. The sputter etch removes contaminants from the seed layer 208. The hard bias layer 212 and leads 213A and 213B are then provided, via step 128. Preferably, the hard bias layer 212 is cobalt-chromium-platinum. The leads 213A and 213B are 5 preferably gold or copper. FIG. 6D depicts the MR head 200 after deposition of the hard bias layer 212 and the leads 213A and 213B. Because of the presence of the photoresist structure 230, the hard bias layer includes two leads, 212A and 212B. Thus, the hard bias layer is capable of carrying current to and from the MR element 210. In addition, because formation of the hard bias layer 212 is separate from formation of the seed layer 208, there is no chromium separating the hard bias layer 212 and the MR element 210. Referring back to FIG. 5, the bilayer photoresist structure is stripped, via step 130. The second gap 214 and second shield 216 are then provided via steps 132 and 134, respectively.

Thus, the magnetic coupling and junction resistance between the MR element 210 and the hard bias layer 212 are improved. This improvement is achieved without substantially degrading the microstructure and magnetic properties of the hard bias layer 212. In addition, improving the magnetic coupling and junction resistance is relatively easy. As discussed with respect to the methods 100 and 110, the magnetic coupling can be improved by separating deposition of the seed layer 208 and the hard bias layer 212 by formation of the MR element 210. To accomplish this, all that is done is to change the order of deposition and use an additional mask, which forms the photoresist structure 220. Thus, improving the magnetic stability of the MR head 200 can be accomplished relatively simply and relatively inexpensively.

A method and system has been disclosed for providing a more magnetically stable magnetoresistive head. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive head comprising:
   a first gap,
   a seed layer having a space therein, the seed layer disposed above the first gap;
   a magnetoresistive element disposed substantially above the space in the seed layer; and
   a hard bias layer disposed above the seed layer, a portion of the hard bias layer being immediately adjacent to a portion of the magnetoresistive element;
   wherein the magnetoresistive element includes a top, a bottom and an edge, a first portion of the seed layer being sandwiched between a portion of the bottom of the magnetoresistive element and the first gap, a second portion of the seed layer not including the first portion of the seed layer being between the hard bias layer and the first gap, the portion of the hard bias layer being immediately adjacent to the edge of the magnetoresistive element.

2. The magnetoresistive head of claim 1 wherein the seed layer further includes chromium.

3. The magnetoresistive head of claim 2 wherein the hard bias layer further includes cobalt, chromium, and platinum.

4. The magnetoresistive head of claim 1 wherein the magnetoresistive element further includes a giant magnetoresistive element.

5. The magnetoresistive head of claim 1 wherein the magnetoresistive element further includes an an isotropic magnetoresistive element .

6. The magnetoresistive head of claim 1 wherein the magnetoresistive head further includes a contiguous junction head.

* * * * *